United States Patent
Hsieh

(10) Patent No.: US 11,310,482 B2
(45) Date of Patent: Apr. 19, 2022

(54) DISPLAY PANEL, DISPLAY APPARATUS, THREE-DIMENSIONAL DISPLAY METHOD AND THREE-DIMENSIONAL DISPLAY SYSTEM

(71) Applicant: BOE Technology Group Co., Ltd., Beijing (CN)

(72) Inventor: Mingche Hsieh, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/964,341

(22) PCT Filed: Dec. 25, 2019

(86) PCT No.: PCT/CN2019/128341
§ 371 (c)(1),
(2) Date: Jul. 23, 2020

(87) PCT Pub. No.: WO2020/147535
PCT Pub. Date: Jul. 23, 2020

(65) Prior Publication Data
US 2021/0051314 A1    Feb. 18, 2021

(30) Foreign Application Priority Data

Jan. 18, 2019   (CN) .......................... 201910048979.2

(51) Int. Cl.
*H04N 13/32* (2018.01)
*H04N 13/388* (2018.01)

(52) U.S. Cl.
CPC .......... *H04N 13/32* (2018.05); *H04N 13/388* (2018.05)

(58) Field of Classification Search
CPC .... H04N 13/32; H04N 13/388; H04N 13/393; G09F 9/30; G02B 30/00
(Continued)

(56) References Cited

U.S. PATENT DOCUMENTS

2006/0001650 A1* 1/2006 Robbins .............. G06F 3/04845
                                                              345/173
2010/0315324 A1* 12/2010 Nam .................... H04N 13/354
                                                              345/102
(Continued)

FOREIGN PATENT DOCUMENTS

| CN | 104848095 A | 8/2015 |
| CN | 106842601 A | 6/2017 |

(Continued)

OTHER PUBLICATIONS

Office Action dated Oct. 23, 2020, issued in counterpart CN Application No. 201910048979.2, with English Translation. (14 pages).

*Primary Examiner* — Tung T Vo
(74) *Attorney, Agent, or Firm* — WHDA, LLP

(57) ABSTRACT

Embodiments of the present disclosure provide a display panel, a display apparatus, a three-dimensional display method and a three-dimensional display system. The display panel includes: a base substrate, a controller, a plurality of light emitting structures, and a plurality of adjusting bodies, wherein the adjusting bodies are disposed below a side of the light emitting structures close to the base substrate, at least a part of the adjusting bodies are configured to move in a direction toward or away from the light emitting structures and drive the light emitting structures to move under a control of the controller.

18 Claims, 2 Drawing Sheets

(58) Field of Classification Search
USPC .......................................................... 348/51
See application file for complete search history.

(56) References Cited

U.S. PATENT DOCUMENTS

| | | | |
|---|---|---|---|
| 2010/0315413 A1* | 12/2010 | Izadi .................... | G06F 3/0421 |
| | | | 345/419 |
| 2012/0001890 A1* | 1/2012 | Kook .................. | G02F 1/13394 |
| | | | 345/212 |
| 2014/0267955 A1* | 9/2014 | Hibayashi ......... | G02F 1/134309 |
| | | | 349/12 |
| 2015/0192481 A1 | 7/2015 | Nguyen et al. | |
| 2015/0220212 A1* | 8/2015 | Kim ..................... | G06F 3/0412 |
| | | | 345/175 |
| 2015/0227795 A1* | 8/2015 | Starner ................ | G06K 9/4604 |
| | | | 345/156 |
| 2015/0293402 A1* | 10/2015 | Shinkai ............... | G02F 1/13476 |
| | | | 349/15 |
| 2017/0150624 A1 | 5/2017 | Bi et al. | |
| 2018/0012948 A1* | 1/2018 | Lee .................... | H01L 27/1218 |
| 2018/0313695 A1* | 11/2018 | Shim .................... | G06K 9/2018 |
| 2018/0342176 A1 | 11/2018 | Califorrniaa | |
| 2020/0264461 A1* | 8/2020 | Kuwana ................... | G09F 9/30 |

FOREIGN PATENT DOCUMENTS

| | | |
|---|---|---|
| CN | 107172416 A | 9/2017 |
| CN | 108281542 A | 7/2018 |
| CN | 108492363 A | 9/2018 |
| CN | 108922917 A | 11/2018 |
| CN | 109001912 A | 12/2018 |
| CN | 109616019 A | 4/2019 |
| KR | 20150112793 A | 10/2015 |
| KR | 20180058581 A | 6/2018 |

* cited by examiner

DISPLAY PANEL, DISPLAY APPARATUS, THREE-DIMENSIONAL DISPLAY METHOD AND THREE-DIMENSIONAL DISPLAY SYSTEM

CROSS-REFERENCE TO RELATED APPLICATION

This application is a Section 371 National Stage Application of International Application No. PCT/CN2019/128341, filed on Dec. 25, 2019 and entitled with "Display Panel, Display Apparatus, Three-Dimensional Display Method and Three-Dimensional Display System", and claims priority to Chinese Application No. 201910048979.2, filed on Jan. 18, 2019, the contents of which are incorporated herein by reference in their entirety.

TECHNICAL FIELD

The present disclosure relates to the field of display technology, and in particular, to a display panel, a display apparatus, a three-dimensional display method and a three-dimensional display system.

BACKGROUND

The three-dimensional display of a display panel mainly applies a naked-eye 3D technology to a two-dimensional plane. The difference between the images received by the left and right eyes makes the user have the illusion of three-dimensional display. This visual effect is poor and the sense of use is affected, therefore the true three-dimensional display effect cannot be achieved.

SUMMARY

According to a first aspect of the present disclosure, there is provided a display panel, comprising: a base substrate, a controller, a plurality of light emitting structures, and a plurality of adjusting bodies, wherein the adjusting bodies are disposed below a side of the light emitting structures close to the base substrate, at least a part of the adjusting bodies are configured to move in a direction toward or away from the light emitting structures and drive the light emitting structures to move under a control of the controller.

According to some embodiments of the present disclosure, each side of the adjusting body is provided with an electrode, the controller is configured to control a voltage applied to the electrode, and the adjusting body is configured to deform and drive the light emitting structures to move under an action of the electrode.

According to some embodiments of the present disclosure, the display panel is provided with a plurality of grooves to divide the display panel into a number of units, each unit is provided with the light emitting structure and the adjusting body, the controller is configured to apply voltages to the electrodes on both sides of the adjusting body of any unit respectively.

According to some embodiments of the present disclosure, the display panel comprises an inorganic film layer, the light emitting structures are provided above the inorganic film layer, and each unit comprises a first area and a second area, the first area is provided with a TFT device, the second area is provided with the adjusting body, and an isolation slot is provided between the TFT device and the adjusting body.

According to some embodiments of the present disclosure, the isolation slot runs through the inorganic film layer, and the isolation slot separates the inorganic film layer located in the first area from the inorganic film layer located in the second area.

According to some embodiments of the present disclosure, the adjusting body is made from a dielectric elastomer material that is deformable under an action of an electric field.

According to some embodiments of the present disclosure, the adjusting body is made from at least one of following materials: silicone rubber, acrylate elastomer, polyurethane elastomer, nitrile rubber, or vinylidene fluoride trifluoroethylene.

According to some embodiments of the present disclosure, the display panel comprises a protective layer provided on an upper side of the light emitting structures away from the base substrate.

According to a second aspect of the present disclosure, there is provided a display apparatus, comprising the display panel according to any one of the above embodiments and a casing, wherein the casing is provided with an accommodating space for accommodating the display panel.

According to a third aspect of the present disclosure, there is provided a three-dimensional display method for the display apparatus according to any one of the above embodiments, wherein the three-dimensional display method comprises: controlling, by the controller, a movement of the adjusting body so as to drive the corresponding light emitting structure to move, according to information of an image to be displayed.

According to a fourth aspect of the present disclosure, there is provided a three-dimensional display system, comprising: a detection apparatus and the display apparatus according to any one of the above embodiments;

wherein the detection apparatus is configured to detect an outline of a physical object to be displayed to obtain outline data; and wherein according to the outline data, the controller of the display apparatus controls a movement of the adjusting body so as to drive the corresponding light emitting structure to move.

According to some embodiments of the present disclosure, in response that the controller does not exert control on the adjusting bodies, surfaces of the plurality of light emitting structures away from the adjusting bodies form a flat reference surface.

According to some embodiments of the present disclosure, the detection apparatus comprises an infrared structured light emitter, an infrared structured light receiver, and an analyzer;

the infrared structured light emitter is configured to emit infrared light to the physical object to be displayed;

the infrared structured light receiver is configured to receive infrared light reflected back by the physical object to be displayed; and the analyzer determines the outline of the physical object to be displayed according to the emitted infrared light and the reflected infrared light to obtain the outline data of the physical object to be displayed.

DETAILED DESCRIPTION OF EMBODIMENTS

Figure 1:
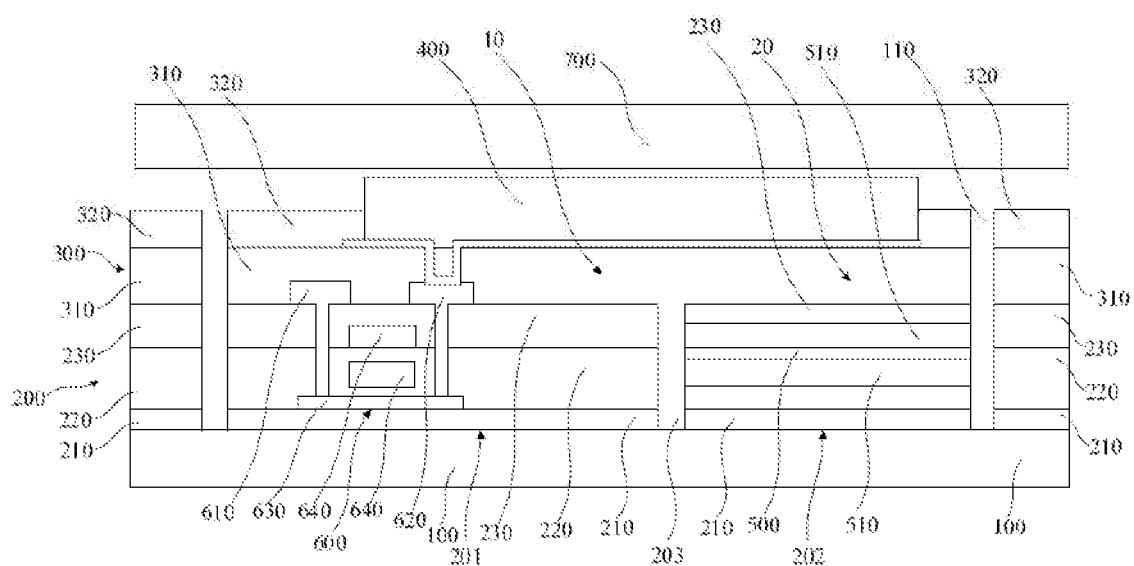
FIG. 1 is a schematic structural diagram of a display panel according to an embodiment of the present disclosure.

Exemplary embodiments will be described in detail here, their examples are shown in the drawings. When the following description refers to the accompanying drawings, unless otherwise indicated, the same numerals in different drawings represent the same or similar elements. The exemplary embodiments described in the following do not represent all embodiments consistent with the present disclosure. Rather, they are merely examples of devices and methods consistent with some aspects of the present disclosure as detailed in the appended claims.

The terminology used in the present disclosure is for the purpose of describing specific embodiments only, and is not intended to limit the present disclosure. The singular forms "a", "said" and "the" used in this disclosure and the appended claims are also intended to include multiple forms unless the context clearly indicates other meanings. It should also be understood that the term "and/or" as used herein refers to and encompasses any or all possible combinations of one or more associated listed items.

It should be understood that the terms "first", "second" and similar words used in the specification and claims of this application do not indicate any order, quantity or importance, but are only used to distinguish different components. Similarly, "a" or "an" and similar words do not indicate a quantity limit, but indicate that there is at least one item. Unless otherwise noted, the terms "front", "rear", "lower", and/or "upper" or the like are only for convenience of description, and are not limited to one position or one spatial orientation. The terms "comprise" or "include" and similar words mean that the elements or objects before "comprise" or "include" cover the elements or objects listed after "comprise" or "include" and their equivalents, and do not exclude other elements or objects. The terms "connecting" or "connected" and similar words are not limited to physical or mechanical connections, and may include electrical connections, whether direct or indirect.

The embodiments of the present disclosure will be described in detail below with reference to the drawings. In the case of no conflict, the features in the following examples and implementations can be combined with each other.

As shown in FIG. 1, an embodiment of the present disclosure discloses a display panel. The display panel can be used as part of the display apparatus. In addition to including the display panel, the display apparatus may also include a casing. The interior of the casing is equipped with an accommodating space to accommodate the display panel. The display apparatus may also include sensors, cameras and other components. The display panel includes a base substrate 100, an inorganic film layer 200, an inorganic film layer 300, light emitting structures 400, a protective layer 700, and a controller that are sequentially stacked.

The display panel further includes adjusting bodies 500. The adjusting bodies are provided on a lower side of the light emitting structures 400 close to the base substrate 100, and at least a part of the adjusting bodies 500 are configured to move in a direction toward or away from the light emitting structures 400 and to drive the light emitting structures 400 to move under the control of the controller.

In this embodiment, the adjusting body 500 can drive upward movement or downward movement of the light emitting structure 400. The "upward movement" referred to here is to move in a direction away from the base substrate 100, and the "downward movement" is to move in a direction close to the base substrate 100, and surfaces of the plurality of light emitting structures 400 away from the adjusting bodies 500 can be formed with a concave or convex structure to realize a three-dimensional display and improve the user's real perception.

In this embodiment, the adjusting body 500 is deformable under the action of a voltage.

Specifically, electrodes 510 are provided on both sides of the adjusting body 500, and the adjusting body 500 can deform and drive the light emitting structure 400 to move under the action of the electrodes 510. The controller is electrically connected to the electrodes 510, and is configured to control the voltage applied to the electrodes 510. Under the control of the controller, different voltages can be applied to the electrodes 510 on both sides of the adjusting body 500. Deformation of the adjusting body 500 occurs, that is, expansion or contraction occurs, under the action of an electrical field of the adjusting body 500. One side of the adjusting body 500 close to the light emitting structure 400 will move upward or downward.

For example, the adjusting body 500 can be a dielectric elastomer material that can deform under the action of an electric field. For example, a material of the adjusting body can be at least one of silicone rubber, acrylate elastomer, polyurethane elastomer, nitrile rubber, vinylidene fluoride trifluoroethylene or other composite materials. The adjusting body can also be made of piezoelectric ceramic material. If an electric field with the same polarization direction as the adjusting body 500 is applied to the electrodes 510 on both sides of the adjusting body 500, the electric field increases the polarization intensity, and the distance between the positive and negative bound charges inside the adjusting body 500 increases. An elongated deformation of the adjusting body 500 is generated along the polarization direction, that is, the side of the adjusting body 500 close to the light emitting structure 400 will move upward to drive the light emitting structure 400 to move upward. If an electric field with a polarization direction opposite to that of the adjusting body 500 is applied to the electrodes 510 on both sides of the adjusting body 500, the distance between the positive and negative bound charges inside the adjusting body 500 decreases, and the adjusting body 500 contracts and deforms along the polarization direction, that is, the side of the adjusting body 500 close to the light emitting structure 400 will move downward to drive the light emitting structure 400 to move downward.

Of course, the adjusting body 500 may also expand or contract in shape in other ways, and move upward or downward toward the surface of the light emitting structure 400 to drive the light emitting structure 400 above the adjusting body 500 to move upward or downward.

Alternatively, the adjusting body 500 may not be deformed, and a device for driving the adjusting body 500 to move upward or downward is provided around the adjusting body 500. The device may change the position of the adjusting body 500 to drive the light emitting structure 400 above the adjusting body 500 to move upward or downward. For example, the adjusting body is magnetic, and a control element is arranged around the adjusting body. The control element and the adjusting body can be displaced relative to each other by the action of magnetic force. By changing the position of the control element and the magnetic field strength, the position of the adjusting body can be changed to drive the light emitting structure to move.

Alternatively, the surface of the adjusting body is provided with a movable waved element, and the movable waved element moves toward or away from the adjusting body to change the position of the adjusting body so as to drive the light emitting structure to move. Alternatively, the adjusting body is a movable part, and the adjusting body drives the movement of the light emitting structure by moving toward or away from the light emitting structure.

Further, in this embodiment, the protective layer is a flexible, bendable protective layer, and the protective layer is overlaid on the upper side of the light emitting structure 400 away from the base substrate 100. When the light emitting structure 400 moves upward or downward, at least part of the corresponding protective layer protrudes upward or recesses downward. When the plurality of light emitting structures 400 move upward or downward to a certain position, the protective layer may exhibit a certain protruded or recessed shape, to achieve a three-dimensional display. The protective layer is made of transparent material, so that the light emitted by the light emitting structure can be seen through the protective layer.

Of course, in other embodiments, the protective layer may also be made of non-deformable materials. The protective layer and the light emitting structure 400 are spaced apart so that when the light emitting structure 400 moves upward or downward, the surface of the light emitting structure 400 close to the protective layer will not touch the protective layer, avoiding the light emitting structure 400 or the protective layer from bumping and abrasion due to the movement of the light emitting structure 400. When the light emitting structure 400 moves upward or downward, the distance between the light emitting structure 400 and the protective layer changes, and the protective layer does not deform. When the plurality of light emitting structures 400 move upward or downward to a certain position, the upper surfaces of the plurality of light emitting structures 400, that is, the surfaces of the light emitting structures 400 facing the protective layer may exhibit a certain protruded or recessed shape, and a user can observe the protruded or recessed shape through the protective layer, and in this way, it can also achieve a three-dimensional display.

Further, the inorganic film layer 200 is provided above the base substrate 100, and the light emitting structure 400 is provided above the inorganic film layer 200. Grooves 110 are provided in the inorganic film layer 200 to divide the display panel into several units, and each unit of the display panel is correspondingly provided with the light emitting structure 400 and the adjusting body 500, the adjusting body 500 can correspondingly change upper and lower position of the light emitting structure 400. The controller can apply voltage to the electrodes 510 on both sides of the adjusting body 500 of any unit. In this embodiment, the inorganic film layer 200 of each unit is provided with one light emitting structure 400, one adjusting body 500, electrodes 510 on both sides of the one adjusting body 500, and a controller that controls the electrodes 510. Of course, in other embodiments, one adjusting body may correspond to multiple light emitting structures.

Through the above arrangement, the electrodes 510 on both sides of different adjusting bodies 500 are located in different units, and the electric fields generated by the electrodes 510 of different units are independent of each other and do not affect each other. The controller can accurately control the voltage applied to the electrode 510 of each unit. The electric fields received by the adjusting bodies 500 of different units are independent of each other, so that the adjusting body 500 can be deformed or the position changes more accurately, so that each light emitting structure 400 can be located at a specified position to achieve a more accurate three-dimensional display.

Further, the display panel further includes a TFT device 600. The display panel of each unit includes a first area 10 and a second area 20. The first area 10 is provided with the TFT device 600, and the second area is provided with the adjusting body 500. An isolation slot 203 is provided between the TFT device 600 and the adjusting body 500. The isolation slot 203 runs through the inorganic film layer 200 and separates the inorganic film layer 200 located in the first area 10 from the inorganic film layer 200 located in the second area 20.

In this embodiment, the TFT device 600 and the adjusting body 500 are spaced apart in the direction perpendicular to the thickness direction of the inorganic film layer 200. When the adjusting body 500 deforms or changes in position, the position of the TFT device 600 does not change.

The TFT device 600 includes a source electrode 610, a drain electrode 620, a polysilicon layer 630 connected to the source electrode 610 and the drain electrode 620, and a gate electrode 640.

In this embodiment, the isolation slot runs through the inorganic film layer, and the isolation slot separates the inorganic film layer located in the first area from the inorganic film layer located in the second area. The inorganic film layer 200 located in the first area 10 forms a first inorganic layer portion 201, and the inorganic film layer 200 located in the second area 20 forms a second inorganic layer portion 202. The isolation slot 203 separates the first inorganic layer portion 201 from the second inorganic layer portion 202. When the adjusting body deforms or changes in position, the second inorganic layer portion 202 provided with the adjusting body also changes in position or shape, and the position and shape of the TFT device 600 remain relatively unchanged. The first inorganic layer portion 201 provided with the TFT device 600 does not change in position or shape. The isolation slot 203 separates the first inorganic layer portion 201 from the second inorganic layer portion 202, it may prevent damage to the inorganic film layer 200 or occurrence of stress concentration due to the difference in the relative shapes or positions of the two portions. Of course, in other embodiments, the isolation slot 203 may not be a through slot. The isolation slot 203 only extends into the interior of the inorganic film layer 200. At least part of the first inorganic layer portion 201 and at least part of the second inorganic layer portion 202 are partially separated. When the second inorganic layer portion 202 is deformed or displaced relative to the first inorganic layer portion 201, the separation of part of the first inorganic layer portion 201 form the second inorganic layer portion 202 reduces the probability of the damage of the inorganic film layer 200 or the occurrence of stress concentration.

Further, the light emitting structure 400 may specifically be an EL (Electro Luminescence) light emitting structure, which includes a first electrode, an electroluminescent material located above the first electrode, and a second electrode located above the electroluminescent material.

Further, the inorganic film layer 200 of each unit includes a base layer 210 (Buffer), a gate layer 220 (Gate Insulator, GI for short) and a dielectric layer 230 (Interlevel Dielectric, ILDC for short) stacked in this order. The dielectric layer 230 may be formed on the upper surface of the gate layer 220 by oxide deposition. The organic film includes a planarization layer 310 (PLN) and a pixel defining layer 320 (PDL) that are sequentially stacked, and the planarization layer 310 may be embedded in the isolation slot 203.

Figure 2:
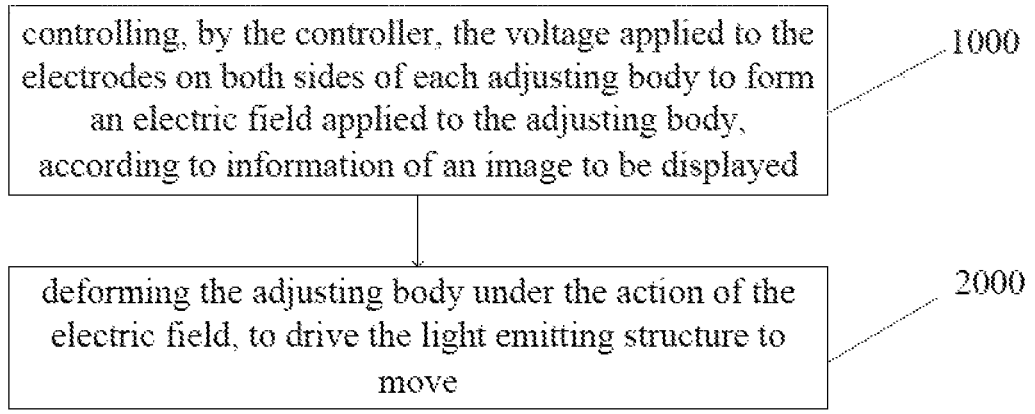
FIG. 2 is a simple schematic flowchart of a three-dimensional display method applicable to a display apparatus according to an embodiment of the present disclosure.

As shown in FIG. 2, the embodiment of the present disclosure also discloses a three-dimensional display method, which is applied to the above-mentioned display apparatus. The above three-dimensional display method includes: controlling, by the controller, a movement of the adjusting body so as to drive the corresponding light emitting structure to move, according to information of an image to be displayed.

Further, according to the information of the image to be displayed, the controller is configured to control the voltage applied to the electrodes 510 located on both sides of each adjusting body 500 to drive the corresponding light emitting structure 400 to move.

The three-dimensional display method includes the following steps.

Step 1000 is of: controlling, by the controller, the voltage applied to the electrodes 510 on both sides of each adjusting body 500 to form an electric field applied to the adjusting body, according to information of an image to be displayed.

Step 2000 is of: deforming the adjusting body 500 under the action of the electric field, to drive the light emitting structure 400 to move, so that the surfaces of the plurality of light emitting structures 400 away from the base substrate 100 form a recessed or protruded surface corresponding to the image to be displayed.

In this embodiment, the information of the image to be displayed is specifically the three-dimensional information of the image to be displayed. The controller is configured to receive the image to be displayed and control the movement of the adjusting body 500 according to the information of the image to be displayed, so that the light emitting structure 400 forms a surface corresponding to the image to be displayed. Among them, the image to be displayed can be a two-dimensional planar graph, and the controller analyzes and obtains the three-dimensional information of the planar graphic, and converts it into a voltage signal and applies it to the electrodes 510, so that the plurality of light emitting structures 400 exhibit a three-dimensional structure. The image to be displayed can also be a three-dimensional graph.

The embodiments of the present disclosure also disclose a three-dimensional display system, which includes a detection apparatus and the above-mentioned display apparatus.

The detection apparatus is configured to detect an outline of the physical object to be displayed to obtain outline data.

According to the outline data, the controller of the display apparatus controls the movement of at least part of the adjusting bodies to drive the corresponding light emitting structures.

In this solution, the surfaces of the plurality of light emitting structures away from the adjusting bodies can show an outline corresponding to the outline of the physical object to be displayed.

Specifically, the controller converts the outline data into a voltage value, and applies it to the electrodes 510 on both sides of the adjusting body 500, so that the surfaces of the plurality of light emitting structures 400 away from the adjusting bodies 500 display an outline that corresponds to the outline of the physical object to be displayed.

In this embodiment, the detection apparatus also includes an infrared structured light emitter, an infrared structured light receiver, and an analyzer. The infrared structured light emitter is configured to emit infrared light to the physical object to be displayed. The infrared structured light receiver is configured to receive infrared light reflected back by the physical object to be displayed. The analyzer determines the outline of the physical object to be displayed according to the emitted infrared light and the reflected infrared light to obtain the outline data of the physical object to be displayed. With this arrangement, when a user specifies any physical object as a physical object to be displayed, the detection apparatus can obtain the outline data of the physical object to be displayed, and the controller of the display apparatus can control movement of the adjusting body according to the outline data of the above physical object to be displayed, so as to drive the corresponding light emitting structure to move, so that the surfaces of the light emitting structures 400 away from the adjusting bodies 500 shows an outline that corresponds to the outline of the physical object to be displayed.

Of course, the physical object to be displayed can be the data pre-stored in the memory of the display apparatus. The memory stores outline data of a plurality of physical objects to be displayed. The user can select a desired physical object to be displayed. The detection apparatus can control the voltage of the electrodes 510 according to the outline data of the physical object to be displayed.

In addition, when the controller does not apply control to the adjusting body, that is, when the controller does not apply voltage to the electrodes 510 on both sides of the adjusting body 500, the surfaces of the plurality of light emitting structures 400 away from the adjusting bodies 500 form a flat reference surface. When the controller applies control to the adjusting body, that is, when the controller applies different voltages to the electrodes 510 on both sides of the adjusting body 500, the adjusting body 500 drives the light emitting structure 400 to move. With this arrangement, when the user only needs the display apparatus to perform two-dimensional display, the controller may not apply voltage to the electrodes 510 or apply the same voltage to the electrodes on both sides of the adjusting body 500. In this case, the surfaces of the plurality of light emitting structures 400 away from the adjusting bodies 500 form a flat reference surface, to realize two-dimensional planar display.

The embodiments of the present disclosure provide a display panel, a display apparatus, a three-dimensional display method, and a three-dimensional display system. The display panel, the display apparatus, the three-dimensional display method, and the three-dimensional display system can achieve concave-convex three-dimensional display effect.

The positive improvement effect of the embodiments of the present disclosure is as follows: by setting the adjusting body with adjustable position, the adjusting body can drive the light emitting structure to move upward or downward under the control of the controller. The surfaces of the plurality of light emitting structures away from the adjusting bodies can form a recessed or protruded structure, so as to achieve a three-dimensional display effect and improve the users real perception.

The above are only the preferred embodiments of the present disclosure, and do not limit the present disclosure in any form. Although the present disclosure has been disclosed as the preferred embodiment above, it is not intended to limit the present disclosure. Those skilled in the art, without departing from the scope of the technical solutions of the present disclosure, can use the technical content disclosed above to make some changes or modifications to obtain equivalent embodiments with equivalent changes. Any simple modifications, equivalent changes, and modifications to the above embodiments based on the technical essence of the present disclosure without departing from the scope of the technical solutions of the present disclosure still fall within the scope of the technical solutions of the present disclosure.

What is claimed is:

1. A display panel, comprising: a base substrate, a controller, a plurality of light emitting structures, and a plurality of adjusting bodies, wherein the adjusting bodies are disposed below a side of the light emitting structures close to the base substrate, at least a part of the adjusting bodies are configured to move in a direction toward or away from the light emitting structures and drive the light emitting structures to move under a control of the controller;

wherein a concave or convex structure is formed on surfaces of the plurality of light emitting structures to realize a three-dimensional display for the display panel; and wherein the display panel comprises an inorganic film layer, the light emitting structures are provided above the inorganic film layer, and each unit comprises a first area and a second area, the first area is provided with a thin film transistor (TFT) device, the second area is provided with the adjusting body, and an isolation slot is provided between the TFT device and the adjusting body.

2. The display panel of claim 1, wherein each side of the adjusting body is provided with an electrode, the controller is configured to control a voltage applied to the electrode, and the adjusting body is configured to deform and drive the light emitting structures to move under an action of the electrode.

3. The display panel of claim 2, wherein the display panel is provided with a plurality of grooves to divide the display panel into a number of units, each unit is provided with the light emitting structure and the adjusting body, the controller is configured to apply voltages to the electrodes on both sides of the adjusting body of any unit respectively.

4. The display panel of claim 1, wherein the isolation slot runs through the inorganic film layer, and the isolation slot separates the inorganic film layer located in the first area from the inorganic film layer located in the second area.

5. The display panel of claim 2, wherein the adjusting body is made from a dielectric elastomer material that is deformable under an action of an electric field.

6. The display panel of claim 5, wherein the adjusting body is made from at least one of following materials: silicone rubber, acrylate elastomer, polyurethane elastomer, nitrile rubber, or vinylidene fluoride trifluoroethylene.

7. The display panel of claim 1, wherein the display panel comprises a protective layer provided on an upper side of the light emitting structures away from the base substrate.

8. A display apparatus, comprising the display panel according to claim 1 and a casing, wherein the casing is provided with an accommodating space for accommodating the display panel.

9. A three-dimensional display method for the display apparatus of claim 8, wherein the three-dimensional display method comprises: controlling, by the controller, a movement of the adjusting body so as to drive the corresponding light emitting structure to move, according to information of an image to be displayed.

10. A three-dimensional display system, comprising: a detection apparatus and the display apparatus according to claim 8;

wherein the detection apparatus is configured to detect an outline of a physical object to be displayed to obtain outline data; and wherein according to the outline data, the controller of the display apparatus controls a movement of the adjusting body so as to drive the corresponding light emitting structure to move.

11. The three-dimensional display system of claim 10, wherein in response that the controller does not exert control on the adjusting bodies, surfaces of the plurality of light emitting structures away from the adjusting bodies form a flat reference surface.

12. The three-dimensional display system according to claim 10, wherein the detection apparatus comprises an infrared structured light emitter, an infrared structured light receiver, and an analyzer;

the infrared structured light emitter is configured to emit infrared light to the physical object to be displayed;

the infrared structured light receiver is configured to receive infrared light reflected back by the physical object to be displayed; and the analyzer determines the outline of the physical object to be displayed according to the emitted infrared light and the reflected infrared light to obtain the outline data of the physical object to be displayed.

13. The display panel of claim 2, wherein the display panel comprises a protective layer provided on an upper side of the light emitting structures away from the base substrate.

14. The display panel of claim 3, wherein the display panel comprises a protective layer provided on an upper side of the light emitting structures away from the base substrate.

15. The display panel of claim 1, wherein the display panel comprises a protective layer provided on an upper side of the light emitting structures away from the base substrate.

16. The display panel of claim 4, wherein the display panel comprises a protective layer provided on an upper side of the light emitting structures away from the base substrate.

17. The display panel of claim 5, wherein the display panel comprises a protective layer provided on an upper side of the light emitting structures away from the base substrate.

18. The display panel of claim 6, wherein the display panel comprises a protective layer provided on an upper side of the light emitting structures away from the base substrate.

* * * * *